(12) United States Patent
Huang et al.

(10) Patent No.: US 7,703,531 B2
(45) Date of Patent: *Apr. 27, 2010

(54) MULTIFUNCTIONAL NANOPARTICLES FOR DOWNHOLE FORMATION TREATMENTS

(75) Inventors: Tianping Huang, Spring, TX (US); James B. Crews, Willis, TX (US); John Robert Willingham, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/180,111

(22) Filed: Jul. 25, 2008

(65) Prior Publication Data

US 2009/0065209 A1 Mar. 12, 2009

Related U.S. Application Data

(63) Continuation-in-part of application No. 11/931,501, filed on Oct. 31, 2007, and a continuation-in-part of application No. 11/931,706, filed on Oct. 31, 2007, and a continuation-in-part of application No. 11/679,018, filed on Feb. 26, 2007, and a continuation-in-part of application No. 11/849,820, filed on Sep. 4, 2007, and a continuation-in-part of application No. 11/125,465, filed on May 10, 2005, now Pat. No. 7,343,972, said application No. 11/849,820 and a continuation-in-part of application No. 11/755,581, filed on May 30, 2007, now Pat. No. 7,550,413.

(60) Provisional application No. 60/845,916, filed on Sep. 20, 2006, provisional application No. 60/570,601, filed on May 13, 2004, provisional application No. 60/815,693, filed on Jun. 22, 2006.

(51) Int. Cl.
E21B 43/267 (2006.01)
(52) U.S. Cl. .................. 166/308.3; 166/278; 166/208.2
(58) Field of Classification Search ........................ None
See application file for complete search history.

(56) References Cited

U.S. PATENT DOCUMENTS

| | | | |
|---|---|---|---|
| 4,931,195 A | 6/1990 | Cao et al. | |
| 5,518,996 A | 5/1996 | Maroy et al. | |
| 5,807,812 A | 9/1998 | Smith et al. | |
| 5,858,928 A | 1/1999 | Aubert et al. | |
| 5,964,295 A | 10/1999 | Brown et al. | |
| 6,211,120 B1 | 4/2001 | Welch et al. | |
| 6,258,859 B1 | 7/2001 | Dahayanake et al. | |
| 6,306,800 B1 | 10/2001 | Samuel et al. | |
| 6,506,710 B1 | 1/2003 | Hoey et al. | |
| 6,599,863 B1 | 7/2003 | Palmer et al. | |
| 6,605,570 B2 | 8/2003 | Miller et al. | |
| 6,613,720 B1 | 9/2003 | Feraud et al. | |
| 6,631,764 B2 | 10/2003 | Parlar et al. | |
| 6,881,709 B2 | 4/2005 | Nelson et al. | |
| 7,036,585 B2 | 5/2006 | Zhou et al. | |
| 7,052,901 B2 | 5/2006 | Crews | |
| 7,060,661 B2 | 6/2006 | Dobson, Sr. et al. | |
| 7,081,439 B2 | 7/2006 | Sullivan et al. | |
| 7,084,095 B2 | 8/2006 | Lee et al. | |
| 7,131,491 B2 | 11/2006 | Blauch et al. | |
| 7,204,311 B2 | 4/2007 | Welton et al. | |
| 7,207,388 B2 | 4/2007 | Samuel et al. | |
| 7,226,896 B2 | 6/2007 | Audibert-Hayet et al. | |
| 7,258,170 B2 | 8/2007 | Nguyen et al. | |
| 7,265,079 B2 | 9/2007 | Willberg et al. | |
| 2003/0092581 A1 | 5/2003 | Crews | |
| 2003/0234103 A1 | 12/2003 | Lee et al. | |
| 2004/0106525 A1 | 6/2004 | Willberg et al. | |
| 2004/0152601 A1 | 8/2004 | Still et al. | |
| 2005/0107265 A1 | 5/2005 | Sullivan et al. | |
| 2005/0252658 A1 | 11/2005 | Willingham et al. | |
| 2006/0027369 A1 | 2/2006 | Baycroft et al. | |
| 2006/0041028 A1 | 2/2006 | Crews | |

(Continued)

FOREIGN PATENT DOCUMENTS

WO 2008036812 A2 3/2008

OTHER PUBLICATIONS

U.S. Appl. No. 11/931,501, filed Oct. 31, 2007, Huang et al., Serial No. of Related Application.

(Continued)

*Primary Examiner*—Zakiya W. Bates
(74) *Attorney, Agent, or Firm*—Mossman Kumar & Tyler PC (57) ABSTRACT

An aqueous, viscoelastic fluid gelled with a viscoelastic surfactant (VES) is stabilized with an effective amount of an alkaline earth metal oxide alkaline earth metal hydroxide, alkali metal oxides, alkali metal hydroxides transition metal oxides, transition metal hydroxides, post-transition metal oxides, and post-transition metal hydroxides. These fluids are more stable and have a reduced or no tendency to precipitate, particularly at elevated temperatures, and may also help control fluid loss. When the particle size of the magnesium oxide or other particulate agent is a nanometer scale, for instance having a mean particle size of 100 nm or less, that scale may provide particle charges that use chemisorption, "crosslinking" and/or other chemistries to associate and stabilize the VES fluids, and also help trap or fixate formation fines when deposited into a proppant pack in a fracture.

18 Claims, 2 Drawing Sheets

U.S. PATENT DOCUMENTS

| | | | |
|---|---|---|---|
| 2006/0162928 A1* | 7/2006 | Collins et al. | 166/279 |
| 2006/0211775 A1 | 9/2006 | Crews | |
| 2006/0211776 A1 | 9/2006 | Crews | |
| 2006/0258541 A1 | 11/2006 | Crews | |
| 2007/0056737 A1 | 3/2007 | Crews et al. | |
| 2008/0139419 A1 | 6/2008 | Huang | |

OTHER PUBLICATIONS

U.S. Appl. No. 11/931,706, filed Oct. 31, 2007, Huang et al., Serial No. of Related Application.

J. Hibbeler, et al., "An Integrated Long-Term Solution for Migratory Fines Damages," SPE 81017, SPE Latin American and Caribbean Petroleum Engineering Conference, Apr. 27-30, 2003, pp. 1-11, Port-of-Spain, Trinidad, West Indies.

J. B. Crews, "Internal Phase Breaker Technology for Viscoelastic Surfactant Gelled Fluids," SPE 93449, 2005 SPE International Symposium on Oilfield Chemistry, Houston, Texas Feb. 2-4, 2005.

Schlumberger, "ClearFRAC HT Surfactant" Datasheet, Apr. 2005.

C. H. Bivins, et al., "New Fibers for Hydraulic Fracturing," Oilfield Review, Summer 2005, pp. 34-43.

Schlumberger, "ClearFRAC HiPerm Surfactant" Datasheet, Aug. 2005.

R. Gdanski, et al., "Fracture Face Skin Evolution During Cleanup," SPE 101083, 2006 SPE Annual Technical Conference and Exhibition, San Antonio, Texas, Sep. 24-27, 2006.

J. A. Ayoub, et al., "New Results Improve Fracture Cleanup Characterization and Damage Mitigation," SPE 102326, 2006 SPE Annual Technical Conference and Exhibition, San Antonio, Texas, Sep. 24-27, 2006.

H. A. Nasr-El-Din, et al., "Lessons Learned and Guidelines for Matrix Acidizing with Viscoelastic Surfactants," SPE 102468, 2006 SPE Annual Technical Conference and Exhibition, San Antonio, Texas, Sep. 24-27, 2006.

H. A. Nasr-El-Din, et al., "Acid Fracturing of Deep Gas Wells Using a Surfactant-Based Acid: Long-Term Effects on Gas Production Rate," SPE 102469, 2006 SPE Annual Technical Conference and Exhibition, San Antonio, Texas, Sep. 24-27, 2006.

P. D. Nguyen, et al., "Controlling Formation Fines at Their Sources to Maintain Well Productivity," SPE 97659, SPE International Improved Oil Recovery Conference in Asia Pacific, Kuala Lumpur, Dec. 5-6, 2005; republished SPE Production & Operations, May 2007, pp. 202-215.

T. Huang, et al., "Nanotechnology Applications in Viscoelastic Surfactant Stimulation Fluids," SPE 107728, European Formation Damage Conference, Scheveningen, The Netherlands, 30 May 30-Jun. 1, 2007.

Clearfrac HT Web page, 2007, available at http://www.slb.com/content/services/stimulation/fracturing/clearfrac_ht.asp?

Clearfrac HT Web page, 2007, available at http://www.slb.com/content/services/stimulation/fracturing/clearfrac_hiperm.asp?

* cited by examiner

MULTIFUNCTIONAL NANOPARTICLES FOR DOWNHOLE FORMATION TREATMENTS

CROSS-REFERENCE TO RELATED APPLICATIONS

This application is a continuation-in-part application of U.S. Ser. No. 11/931,501 filed Oct. 31, 2007; U.S. Ser. No. 11/931,706 filed Oct. 31, 2007; U.S. Ser. No. 11/679,018 filed Feb. 26, 2007; and U.S. Ser. No. 11/849,820 filed Sep. 4, 2007, the latter which claims the benefit of U.S. Provisional Patent Application 60/845,916 filed Sep. 20, 2006, and in turn is a continuation-in-part application of U.S. Ser. No. 11/125,465 filed May 10, 2005 which in turn claims the benefit of U.S. Provisional Patent Application 60/570,601 filed May 13, 2004, and is a continuation-in-part application of U.S. Ser. No. 11/755,581 filed May 30, 2007 which in turn claims the benefit of U.S. Provisional Patent Application 60/815,693 filed Jun. 22, 2006.

TECHNICAL FIELD

The present invention relates to aqueous viscoelastic fluids used during hydrocarbon recovery operations, and more particularly relates, in one non-limiting embodiment, to methods and additives for stabilizing and improving such aqueous, viscoelastic fluids as well as fixating formation fines.

BACKGROUND

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which may cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations and the conductivity of propped fractures.

Aqueous fluids gelled with viscoelastic surfactants (VESs) are also known in the art. VES-gelled fluids have been widely used as gravel-packing, frac-packing and fracturing fluids because they exhibit excellent rheological properties and are less damaging to producing formations than crosslinked polymer fluids. VES fluids are also used as acid diverting, water and/or gas control fluids. VES fluids are non-cake-building fluids, and thus leave no potentially damaging polymer cake residue.

It has been discovered that alkaline earth metal oxides, alkaline earth metal hydroxides, transition metal oxides, transition metal hydroxides, and mixtures thereof, and in particular magnesium oxide may serve to inhibit or prevent fluid loss in aqueous fluids gelled with VESs, as described in U.S. Patent Application Application Publication No. 2008/0060812 A1 (U.S. patent application Ser. No. 11/755,581 filed May 30, 2007), incorporated herein in its entirety by reference. Some of these same materials may also be effective as system stabilizers and performance enhancers for aqueous fluids gelled with VESs, as described in U.S. Patent Application Publication 2005/0252658 A1 (U.S. patent application Ser. No. 11/125,465), also incorporated herein in its entirety by reference. However, even these additives may bridge on the face of the formation if the particles are sufficiently large.

The migration of fines involves the movement of fine clay and/or non-clay particles (e.g. quartz, amorphous silica, feldspars, zeolites, silicates, carbonates, oxides, and halides) or similar materials within a subterranean reservoir formation due to drag and other forces during production of hydrocarbons or water. Fines migration may result from an unconsolidated or inherently unstable formation, or from the use of an incompatible treatment fluid that liberates fine particles. Fines migration may cause the very small particles suspended in the produced fluid to bridge the pore throats near the wellbore, thereby reducing well productivity. Damage created by fines is typically located within a radius of about 3 to 5 feet (about 1 to 2 meters) of the wellbore, and may occur in gravel-pack completions and other operations.

Fines migration is a complex phenomenon governed largely by mineralogy, permeability, salinity and pH changes, as well as drag forces created by flow velocity, turbulence and fluid viscosity, as described in detail in J. Hibbeler, et al., "An Integrated Long-Term Solution for Migratory Fines Damage," SPE 81017, SPE Latin American and Caribbean Petroleum Engineering Conference, Port-of-Spain, Trinidad, West Indies, 27-30 April 2003, incorporated herein by reference in its entirety. The authors note that mobilization of fines can severely damage a well's productivity, and that fines damage is a multi-parameter, complex issue that may be due to one or more of the following downhole phenomena: (1) high flow rates, particularly abrupt changes to flow rates; (2) wettability effects, (3) ion exchange; (4) two-phase flow, particularly due to turbulence that destabilize fines in the near-wellbore region; and (5) acidizing treatments of the wrong type or volume which can volume which can cause fines.

J. Hibbeler, et al. note that fines, especially clays, tend to flow depending on their wettability, and since fines are typically water-wet, the introduction of water may trigger fines migration. However, they note that clay particles may become oil-wet or partially oil-wet, due to an outside influence, and thus the fines and clay particles may become attracted to and immersed in the oil phase. The authors also note that all clays have an overall negative charge and that during salinity decrease, pH increases in-situ due to ion exchange. A pH increase may also be induced via an injected fluid. As pH increases, surface potential of fines increases until deflocculation and detachment occurs, aggravating fines migration. Fines fixation has become troublesome during oil and gas production and during many oil and gas recovery operations, such as acidizing, fracturing, gravel packing, and secondary and tertiary recovery procedures.

It would be desirable if methods and/or compositions would be devised to increase the thermal stability and fluid loss control of aqueous fluids thickened with viscoelastic surfactants, which methods and/or compositions could also help fix or stabilize fines within a subterranean formation so that their migration is reduced, inhibited or eliminated.

SUMMARY

There is provided, in one form, a method for reducing fines migration in a subterranean formation, but which also gives improved properties to a fluid used in fracturing the formation. The method involves introducing into the subterranean formation an aqueous-based fluid. The fluid may include a viscoelastic surfactant in an amount effective to increase the viscosity of the fluid and proppants. The fluid also includes a particulate additive in an amount effective to reduce fines migration and further in an amount effective to have an effect of (1) improved stability of the VES-gelled fluid viscosity, and/or (2) improved fluid loss of the VES-gelled fluid, as compared with an otherwise identical fluid absent the nanoparticulate additive. The particulate additive has a mean particle size of 100 nm or less. Suitable materials for the particulate additive include alkaline earth metal oxides, alkaline earth metal earth metal hydroxides, alkali metal oxides, alkali metal hydroxides, transition metal oxides, transition metal hydroxides, post-transition metal oxides, post-transition metal hydroxides, piezoelectric crystals, and/or pyroelectric crystals. The method further includes pumping the fluid against the subterranean formation with sufficient pressure to cause at least one fracture, and depositing the proppants and the particulate additive into the at least one fracture to form a proppant pack.

The particulate additives, which may also be referred to herein as stabilizing or stabilizer agents (e.g. MgO and/or Mg(OH)$_2$, and the like), appear to improve the thermal stability of VES micelle structures when heated, that is, the VES fluid viscosity is more stable over time as fluid temperature is increased. The stabilizing agents have utility over a broad range of temperature of about 180° F. to about 300° F. (about 82° C. to about 149° C.). In many cases, the clean-up of VES fluids may be improved by use of nano size particulate additives that may be much smaller than the pores and pore-throat passages within a hydrocarbon reservoir, thereby being non-pore plugging particles that are less damaging to the reservoir permeability. Additionally, the viscosity stability of the VES fluid may be further improved by use of nano-sized particles that are able to stay within the VES fluid and travel where the VES fluid goes, including any fluid which is leaked-off, that is, any VES fluid that invades and enters the reservoir pores during a treatment, such as during a gravel-pack, frac-pack, hydraulic fracturing, and the like. Since the nano-sized particulate additives stay within the VES fluid, they thereby continue to stabilize the viscosity of the leaked-off VES fluid. This is in contrast to larger size particulate additives that become bridged-off (i.e. which plug the reservoir pores on the reservoir face and prevented from entering the reservoir pore matrix with the VES fluid), including VES stabilizer agents that are larger than about 100 to 1000 nanometers in size.

The improved (more thermally stable) viscosity of the leaked-off VES fluid may be of utility at greater than 200° F. (93° C.) bottom hole static temperature (BHST) as a "pseudo-crosslinked" viscous wall in the near formation face pores that may limit the rate of additional VES fluid leak-off during a stimulation treatment, which includes the additional presence of a stimulating agent.

Unique to the method herein, most, if not all, of the nanoparticles are suspected initially to associate with the elongated VES micelles as a "pseudo-crosslinker". However, after the internal breakers over time at reservoir temperature break, degrade, or rearrange the elongated structure of VES micelles to more spherical shaped non-viscous type micelles, a significant portion of the nanoparticles are released from the "pseudo-crosslinked" viscous micelles structures. That is, the portion of nanoparticles that associate or pseudo-crosslink the elongated micelles structure during a fracturing treatment will lose their VES micelle association or pseudo-crosslinking function when the VES micelles collapse to more spherically-shaped micelles. Upon VES micelle breaking, the nanoparticles are thereby released from their initial function and are now able to associate or become fixated onto the formation minerals and/or proppant particles. It is theorized that the nanoparticles will attach and remain on the reservoir and proppant particles primarily by electrostatic and other charges between the nanoparticle and reservoir and proppant particle surfaces, however, other attractions or coupling forces may exist initially and over the long term to keep the nanoparticles coated on the formation and proppant particles. However, there may be occasions, such as when using small amounts of particulate additives, that formation pore throat bridging of the larger size particles may have utility and/or advantage over use of nano size stabilizer particles. For example, the pore throat bridging of a small amount of larger size stabilizer particles may result in the leaked-off VES fluid no longer having enough stabilizing particles where the leaked-off VES fluid will "break" in viscosity, and for some reservoir conditions (i.e. higher reservoir permeability, higher reservoir pressure crude oil producing zones, and the like) and VES fluid compositions (i.e. type and amount of salts, co-surfactants, solvents, co-solvents, and the like), the viscosity-broken VES fluid may achieve greater than 60% or even 80% return permeability cleanup —a higher cleanup value than achieved in many polymeric-based treatment fluids. Thus, in some cases the larger stabilizing particles may be used to first act as a gel stabilizer during the main portion of the VES treatment and then later act indirectly as a viscosity breaker for the fluid leaked-off into the reservoir, since such fluid may not have enough stabilizer particles to stabilize the may not have enough stabilizer particles to stabilize the fluid's viscosity any longer.

The addition of alkali metal oxides, such as lithium oxide; alkali metal hydroxides, such as potassium hydroxide; alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; and post-transition metal hydroxides (i.e. for all sizes of the stabilizing agents) to an aqueous fluid gelled with a VES may increase the viscosity of the fluid, may reduce the rate of fluid leak-off into the reservoir, may improve the thermal stability of the fluid's viscosity, and may prevent or inhibit the precipitation-like phase separation of the viscoelastic surfactant by improving its high temperature aqueous solubility, and combinations of these effects. In particular, the VES-gelled aqueous fluids containing these agents may be more stable at high temperatures, such as at 200° F. (93° C.) or higher. This discovery allows the VES system to be used at a higher temperature, and helps minimize formation damage after hydraulic fracturing operations. The introduction of these additives to the VES systems could also possibly lower the amount of VES surfactant needed to obtain the stable fluid viscosity necessary to perform VES applications or treatments, particularly since less of the VES is lost due to oil-like phase separation, thermal degradation precipitation, and the like.

Further, the particulate additives, also referred to herein as nano-sized particles or nanoparticles (e.g. MgO and/or $Mg(OH)_2$, and the like), are effective to fixate, attract, associate and/or flocculate dispersed fines, such as clay and non-clay particles, including charged and non-charged particles, particularly within a proppant pack once the viscosity of the VES fluid is broken and the nanoparticulate additives are released. Due to at least in part to their small size, the surface forces (like van der Waals and electrostatic forces) of nanoparticles help them associate, attract, group or flocculate the fines together in larger collections, associations or agglomerations onto proppant particles. Such groupings or associations help fix the fines in place on the surface of proppant particles and thereby keep them from moving and/or migrating. In many cases, the fines fixing ability of the fluids may be ability of the fluids may be improved by use of nano-sized particulate additives that may be much smaller than the pores and pore-throat passages within a hydrocarbon reservoir, thereby being non-pore plugging particles that are less damaging to the reservoir permeability than the fines themselves. This smaller size permits the nanoparticles to readily enter the formation, where upon VES fluid breaking the nanoparticles will be released and will become fixated or attached to the formation minerals and will then bind up or fix the formation fines in place or attract and fixate the fines that migrate through the pore matrix so that both the formation fines and the nanoparticles remain in the formation and/or proppant pack and do not travel or migrate as far—or at least the fines are restrained to the point that damage to the near-wellbore region of the reservoir is minimized.

The addition of alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and $AlPO_4$, to an aqueous fluid, which is then introduced into a subterranean formation is expected to prevent or inhibit movement or migration of fines within a subterranean formation or fixate troublesome fines within the proppant pack in the subterranean formation, and maintain a well's productivity for longer time.

DETAILED DESCRIPTION

Figure 2:
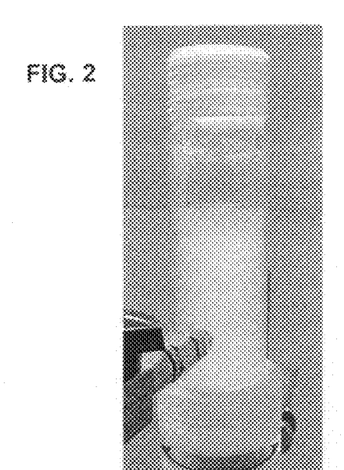
FIG. 2 is a more detailed photograph of the cloudy fluid of formation fines dispersed in water positioned at the top of the sand pack of FIG. 1.

Nanoparticles have been used to increase thermal stability and fluid loss control for aqueous fluids gelled with a viscoelastic surfactant (VES) in hydraulic fracturing and frac packing treatments through the apparent pseudo-crosslinking of the surfactant micelles by the nanoparticles' surface forces, which may include van der Waals and electrostatic forces as discussed in U.S. patent application Ser. No. 2008/0051302 (U.S. Ser. No. 11/849,820) and U.S. patent application Ser. No. 2008020744 (U.S. Ser. No. 11/679,018), both incorporated by reference herein in their entirety. It has been discovered that the same nanoparticles will fixate formation fines in the pore matrix and onto the proppant after internal breakers in a fluid gelled with VES micelles break the viscous structure of the micelles; that is, upon VES micelle breaking most of the VES-micelle associating nanoparticles are released within the leaked-off VES fluid in the pores of the reservoir and the VES fluid remaining in the hydraulic fracture and once the nanoparticles are released they become attached, fixated, or become associated onto the surfaces of the minerals of the formation and to the fracture proppant bed (pack). Release of the nanoparticles by internally breaking VES micelles is schematically illustrated in FIG. 2 of T. Huang, et al., "Nanotechnology Applications in Viscoelastic Surfactant Stimulation Fluids," SPE 107728, European Formation Damage Conference, Scheveningen, The Netherlands, 30 May-1 Jun. 2007, incorporated herein by reference.

Magnesium oxide particles and powders have been used as stabilizers for VES-gelled aqueous fluids at temperatures from about 180 to about 300° F. (about 82 to about 149° C.) as disclosed in U.S. Patent Application Publication 2005/0252658 A1 (U.S. patent application Ser. No. 11/125,465). However, it has been discovered that nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, and mixtures thereof have particular advantages for improving the thermal stability of a VES-gelled aqueous fluid, and because of their small size such particles stay with the VES-gelled fluid, rather than become bridged in the pores on the reservoir face. Thus, the use of these stabilizers may permit less amount of the VES to be used to obtain the same level of viscosity.

It will be appreciated that although MgO particles are noted throughout the application herein as one representative or suitable type of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, and post-transition metal hydroxide.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Mg, Ca, Ti, Zn and/or Al.

Core flow tests with VES-STAL MgO particles high temperature VES stabilizer developed by Baker Oil Tools showed accumulation of most of the MgO particles on the test core face (i.e. most could not enter the pores on the core face) during VES-gelled fluid injection into the cores. This MgO product had a mean particle size of about 5 microns. These particles were too large to penetrate the 50 to 500 millidarcy (md) Berea test cores. It was discovered that by using very small MgO particles, such as nanometer-sized particles, the particles would stay within the VES that leaks off into the subterranean formation during a treatment. Testing of these nano-particle MgO, designated LCA-N801 may be used to stabilize VES-gelled aqueous fluids in place of VES-STA1 MgO particles with similarly good results.

This use of nanometer-sized particles is an improvement over the previous VES-gelled fluid stabilizing chemistry. The LCA-N801 particles have a mean particle size of 30 nanometers (nm). The LCA-N801 nano-MgO product was shown in laboratory tests to pass through the Berea test cores with no plating or accumulation of MgO particles on the core faces or within the core pore matrix. Viscosity stability tests show both particles may achieve thermal stability of the VES-micelles at 250° F. (121° C.) over time, but regain permeability tests show that nano size MgO particles do not generate damage or as great a potential for damage.

The nano-sized MgO particles are also suspected of having additional chemistry useful for VES thermal stability. Without being limited to any one particular theory, it is suspected that some nano-sized MgO particles have unique particle charges that use chemisorption, pseudo-crosslinking and/or other chemistries to associate and stabilize the VES micelles. This technical improvement is helpful in the field when applying the MgO stabilizer technology, to assure VES-gelled fluid stability when leaked-off into a reservoir during a frac-pack or other treatment.

The solid particulates and powders useful herein include, but are not necessarily limited to, alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In another non-restrictive restrictive version, MgO may be obtained in high purity of at least 95 wt %, where the balance may be impurities such as $Mg(OH)_2$, CaO, $Ca(OH)_2$, $SiO_2$, $Al_2O_3$, and the like.

In another non-limiting embodiment, the mean particle size of the additives and agents ranges between about 1 nanometer independently up to about 100 nanometers. In another non-limiting embodiment, the particle size ranges between about 4 nanometers independently up to about 90 nanometers. In another non-restrictive version, the particles may have a mean particle size of about 65 nm or less, alternatively about 50 nm or less, and in another possible version about 40 nm or less.

The amount of nano-sized particles in the VES-gelled aqueous fluid may range from about 20 to about 500 pptg (about 2.4 to about 60 kg/1000 liters). Alternatively, the lower threshold of the proportion range may be about 5 pptg (about 0.6 kg/1000 liters), while the upper threshold of proportion of the particles may independently be about 600 pptg (about 72 kg/1000 liters) pptg.

The nano-sized particles herein may be added along with the VES fluids prior to pumping downhole or other application. The VES-gelled aqueous fluids may be prepared by blending or mixing a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid (for completing a well) or other application, for a non-limiting example. Alternatively, the nano-sized particles herein may be added to water, brine, glycol, fatty acid, mineral oil or other hydrocarbon as the carrier fluid and then batch mixed or added on-the-fly to the VES gelled fluid during the treatment. During the sand or proppant addition stages of a treatment it is suspected that a least a portion of the nanoparticles may initially coat, or at least partially coat, attach to or associate with the surfaces of the sand or proppant particles, which are then pumped into place downhole in a hydraulic frac, frac-pack or gravel pack treatment.

VES-gelled fluids are composed of low molecular weight surfactants that form elongated micelle structures which exhibit viscoelastic behavior to increase fluid viscosity by interaction of the micelles, such as through entanglement. VES fluids are unlike polymer-based systems in that they are non-wall building and do not form filter cake on the formation face. Without filter cake development, the amount of VES fluid that leaks off from the fracture during a fracturing treatment is primarily fluid viscosity dependent. VES fluids may exhibit relatively high fluid leak-off from the fracture during a treatment and "screening out" is a common problem. Because of poor fluid efficiency, (1) the permeability of a reservoir may be limited to about 800 md, and in most cases is limited to less than about 400 md, (2) more total fluid volume is required for a given treatment, and (3) larger amounts of "leaked-off fluid" within the reservoir matrix occurs which needs to be removed (cleaned up) after treatment. Additionally, conventional VES fluids have not contained internal breakers. That is, they have depended upon reservoir hydrocarbons to contact, break, and clean up the leaked-off VES fluid. However, there are many cases where reliance on external breaking agents (contacting reservoir hydrocarbons, especially in gas wells) does not result in uniform or complete removal of VES fluids from the treated reservoir after a fracturing treatment and impaired production occurs. In many cases post treatment clean-up fluids that contain VES breaking agents (such as alcohols and mutual solvents) have been required to remove unbroken VES fluid within the hydrocarbon producing formation. Post treatment clean-up fluids seldom, if ever, have uniform coverage to contact and remove all unbroken VES fluid from the reservoir. There have been cases where without internal breakers, the VES fluids may generate the same formation damage that polymer-gelled fluids do. Depending on the hydrocarbon in the producing reservoir (the porous medium) in every case to contact the VES micelles to break the VES fluid may be very questionable.

New methods and compositions for fracturing hydrocarbon producing reservoirs have been discovered that will overcome many of the disadvantages of while significantly improving the benefits of using VES fluids. The compositions of the fracturing fluids herein may be a synergistic combination of internal breakers with one or more high temperature stabilizers, fluid loss control agents, and mix water brines up to 14.4 ppg salinity (1.7 kg/liter), e.g. $CaBr_2$, where the same nanoparticles may serve to increase thermal stability and fluid loss control, while also preventing or inhibiting fines from being produced back through a proppant pack. The internal breakers described herein surprisingly work in the presence of several types of VES micelle stabilizers, micelle fluid loss control agents, a wide range of mix water salinity (including divalent ions like calcium and magnesium) for fluid temperature applications ranging from about 80° F. to about 300° F. (about 27 to about 149° C.). The ability of these agents to work together by compatible mechanisms is remarkably unique and allows the many enhanced VES fluid performance properties to be combined.

The fluid loss control nanoparticles herein are those that produce a novel "pseudo-filter cake", that is, a highly viscous layer of VES fluid composed of unique particles associating with VES micelles on the core and formation faces. The ability to generate "pseudo-filter cake" will significantly reduce the rate of VES fluid leak-off, similar to the polymeric-type filter cakes but through the use of completely different mechanisms than conventional polymer filter cakes. The pseudo-filter cake has leak-off control performance similar to or analogous to polymeric-type filter cake, yet the clean-up of the pseudo-filter cake is far superior to that of conventional polymeric filter cake. In polymer filter cake, most of breaker in the polymer fluid system is leaked-off into the formation matrix and leaves a high concentration of polymer in the cake (fracture). The breaker is not attached to or connected with the polymer. In VES pseudo-filter cake, the internal breaker appears to be contained or resident inside of VES micelles and thus goes wherever VES micelles go, in one non-limiting explanation. The fluid loss control nanoparticles may work from about 80° F. to about 300° F. (about 27 to about 149° C.). A wide range of particle types and properties have been found of utility to improve the performance of the VES fluid, which includes, but is not necessarily limited to, surface adsorption, crystal surface charges, piezoelectric and pyroelectric particles, and nano-sized particle properties and technology. Additionally, the synergistic use of internal breakers with the pseudo-filter cake has been discovered to allow the pseudo-filter cake to be readily degraded into an easily producible broken VES fluid. Another improved performance feature is how the fluids herein, a portion of which may inevitably leak-off into the pores of the reservoir during a treatment, can carry with it internal breaker that converts the VES fluid into an easily producible fluid without the need for contacting reservoir hydrocarbons. This is a significant improvement over conventional methods and compositions, which, without contacting hydrocarbons, exhibit very high viscosity at very low shear rates, such as 2000 cps or more at 1 $sec^{-1}$ shear rate. The very high viscosity of VES fluids at very low shear rates makes the leaked-off VES fluid within the pores of the formation require higher reservoir pressure in order to move and remove (clean up) the fluid within the reservoir matrix. Laboratory core clean-up tests have shown that very little pressure and time is required to remove internally broken VES from the pore matrix of Berea cores as compared to VES fluids without an internal breaker.

VES gelled aqueous fluids may exhibit very high viscosity at very low shear rates and under static conditions. The exceptionally high viscosity at low shear rates, often in thousands of centipoise, can make the VES gelled fluid very difficult to move and displace from the pores and fractures of the formation which can be ideal for fracturing fluids. However, while the very high viscosity at very low shear rate may be good for fracturing fluids, this in turn may make VES-based fracturing fluids hard to clean up. Thus, it is important that the viscosity of any VES-based fracturing fluid be reduced or broken in some manner so that it may be easily and quickly flowed back from the formation.

A viscoelastic surfactant-internal breaker aqueous fluid system containing nanoparticles which serve multiple functions as VES stabilizers for high temperature, fluid loss control agents and fixating fines in the formation and in proppant packs, and methods for using these systems for fracturing subterranean formations penetrated by a well bore have been discovered. A viscous gel starts to develop when the viscoelastic surfactant (VES) is mixed with an aqueous base fluid. A salt or other counterion may be used in the aqueous fluid containing VES to to help promote viscous micelle formation. The VES-based fracturing fluid is pumped in one or more sequential stages. The stages of viscoelastic surfactant gelled fluid (that contains the mineral oil and/or fish oil, transition metal ion source, saponified fatty acid, unsaturated or saturated fatty acid or other internal breaker, e.g.) maintains a high viscosity prior to fracturing and eventual breaking (viscosity reduction) of the fluid through action of the breaker. The rate of fluid leak-off during a fracturing treatment is also significantly reduced by the presence of nano-particulate fluid loss control agents. Further, the viscosity stability of the VES-gelled fluid may be improved or enhanced by the presence of the same nanoparticulates serving as high temperature viscosity stabilizing agents. The nanoparticles serving as viscosity stabilizers and fluid loss control agents, further improve the ability of the VES-based aqueous fluid to fracture formations, and each work by a mechanism that does not inhibit the activity or mechanism of the other. In one non-limiting example, the presence of a high temperature viscosity stabilizer does not inhibit the activity of the internal breakers. In another non-limiting example, the presence and activity of a fluid loss control agent does not inhibit the breaking activity of an internal breaker. After completion of the pumping treatment and shut-in of the well, the internal breaker (e.g. mineral oil and/or fish oil, etc.) breaks the viscous gel, i.e. lowers the viscosity of the fracturing fluid readily and easily in the presence of the viscosity stabilizers, and the like. The internally broken VES fluid is very easy to flow back with the producing fluid, leaving little or no damage to the formation. Very little reservoir pressure and time is required to produce and clean up the broken VES fluid. No reliance on reservoir hydrocarbons is required to contact and clean up the VES fracturing fluid. Upon viscosity breaking the nano-particulate additives herein are released from their association with VES micelles and are then able to preferentially attach to or associate with the formation minerals and/or to the proppant particles in the proppant pack.

As previously discussed, fines migration has been troublesome during oil and gas production, as well as during many oil and gas recovery operations including, but not necessarily limited to, acidizing, fracturing, gravel packing, secondary and tertiary recovery operations, and the like. Most of the fines that migrate and cause damage have a charge, and all clay particles generally have an overall negative charge. As defined herein, fines are particles having particle size less than 37 microns (μm).

It has been discovered that nano-sized particles like magnesium oxide (MgO) may be used to fixate formation fines such as clay and quartz in subterranean hydrocarbon formations to inhibit, restrain or prevent them from migrating to near-wellbore regions to choke or damage the production of hydrocarbons. Some nano-sized particles, also called nanoparticles herein, not only have high surface areas compared to their small sizes, but also have relatively high surface charges that permit them to associate or connect other particles together, including other charged particles, but also other non-charged particles. In one non-limiting embodiment, these associations or connections between the fines and the nano-sized particles are due to electrical attractions and other intermolecular forces or effects.

Laboratory tests have demonstrated that relatively small amounts of MgO nanoparticles can fixate and flocculate dispersed clay particles, and charged and non-charged colloidal silicas. Other nanoparticles such as ZnO, $Al_2O_3$, zirconium dioxide ($ZrO_2$), $TiO_2$, cobalt (II) oxide (CoO), nickel (II) oxide (NiO), and pyroelectric and piezoelectric crystals may also be used in the methods and compositions herein.

It is theorized that the nanoparticles remain on the formation minerals and proppant particles primarily by electrostatic and other charges between the nanoparticle and proppant particle surfaces, however, other attractions or coupling forces may exist to initially and over the long-term keep the nanoparticles coated on the formation minerals and proppant particles. The inventors do not want to be limited to any particular theory.

There has evolved in the stimulation fluid art an industry standard need for "quick gel break", but for VES-gelled fluids this has been a substantially challenging problem. There needs to be a method for breaking VES-gelled fluids that can be as easy, as quick, and as economic as breaking conventional polymeric fluids, for instance using an internal breaker. At the same time, it is not desirable to reduce the viscosity of the fluid, i.e. break the gel, immediately or essentially instantaneously. Of considerable concern is the fact than an unbroken VES fluid has exceptionally high viscosity at very low shear rate and static conditions which makes it difficult for reservoir hydrocarbons to contact all of the VES fluid and to displace it from the pores of a treated reservoir. This is particularly true for gas reservoirs and crude oil reservoirs that have heterogeneous permeability with high relative permeability sections present.

New methods have been discovered to reduce the viscosity of aqueous fluids gelled with viscoelastic surfactants (i.e. surfactants that develop viscosity in aqueous brines, including chloride brines, by formation of rod- or worm-shaped micelle structures). The new methods remove the need or reliance on reservoir hydrocarbons to contact, break, and cleanup the viscoelastic fluid. The improvements will allow relatively very quick breaks, such as within 1 to about 16 hours, compared to using bacteria to break VES which takes at least 48 or more hours, and more typically 4 to 7 days. In another non-limiting embodiment the break occurs within about 1 to about 8 hours; alternatively from about 1 to about 4 hours, and in another non-restrictive version about 1 to about 2 hours. The breaker components herein can be used as an internal breaker, e.g. added to the gel after batch mixing of a VES-gel treatment, or added on-the-fly after continuous mixing of a VES-gel treatment using a liquid additive metering system in one non-limiting embodiment, or the components can be used separately, if needed, as an external breaker solution to remove VES gelled fluids already placed downhole. Internal breakers suitable for the methods and compositions herein include transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof. Bacteria may also be used alone or conjunction with these other internal breakers, although as noted, reducing the viscosity of VES gelled fluids with bacteria is relatively slow. The use of bacteria as a viscosity breaker for VES gelled fluids is described in U.S. Pat. No. 7,052,901 to Baker Hughes, incorporated herein incorporated herein in its entirety by reference. Surprisingly, it has been found that the use of internal breakers will allow release of the particulate additives from a VES fluid matrix; that is, upon VES fluid viscosity breaking by internal breakers the particulate additive no longer has VES micelle association, such as pseudo-crosslinking interactions, and is then able to attach, associate, or become fixated to formation minerals where leaked-off VES fluid has occurred and/or to proppant particles in the proppant bed (pack).

The internal breakers (e.g. mineral oils, hydrogenated polyalphaolefin oils, saturated fatty acids, polyunsaturated fatty acids, and the like) are not solubilized in the brine, since they are inherently hydrophobic, but rather interact with the VES surfactant worm-like micelle structures initially as dispersed microscopic oil droplets and thus form an oil-in-water type emulsion where the oil droplets are dispersed in the "internal phase" as a "discontinuous phase" of the brine medium/VES fluid which is the "outer phase" or "continuous phase". Laboratory tests have shown that small amounts of unsaturated fatty acids, enough to eventually completely the break VES viscosity, will not spontaneously degrade VES viscosity upon individual association and dispersion within the VES micelles, but will become active to degrade VES viscosity upon activation, such as auto-oxidation of the fatty acids to products that disrupt the elongated, "rod-like" or "worm-like" micelles.

Information about using mineral oils, hydrogenated polyalphaolefin oils and saturated fatty acids as internal breakers may be found in U.S. Patent Application Publication No. 2007/0056737 A1 (Ser. No. 11/517,688 filed Sep. 8, 2006), incorporated by reference herein in its entirety.

In another non-limiting embodiment these gel-breaking products or breakers work by rearrangement of the VES micelles from rod-shaped or worm-shaped elongated structures to spherical structures. The breaking components described herein may also include the unsaturated fatty acid or polyenoic and monoenoic components of U.S. Patent Application Publication 2006/0211776 A1, (Ser. No. 11/373, 044 filed Mar. 10, 2006), incorporated herein in its entirety by reference.

The use of transition metal ion sources as breakers for VES-gelled fluids is more fully described in U.S. Patent Application Publication 2006/0041028 A1 (U.S. Ser. No. 11/145,630 filed Jun. 6, 2005), incorporated by reference herein in its entirety. Briefly, the transition metal ion source used as an internal breaker may include a transition metal salt or transition metal complex, where the transition metal may be from Groups VA, VIA, VIIA, VIIIA, IB, IIB, IIIB, and IVB of the Periodic Table (previous IUPAC American Group notation). One or more chelating agents and/or one or more reducing agent sources may also be used in conjunction with the transition metal ion sources as breaking agents. In one non-limiting embodiment, the amount of transition metal ion from the transition metal ion source ranges from about 0.01 to about 300 ppm, based on the total fluid.

The use of saponified fatty acids as breakers for VES gelled aqueous fluids as breakers is more fully described in U.S. Patent Application Publication 2006/0211775 A1 (U.S. Ser. No. 11/372,624 filed Mar. 10, 2006), incorporated by reference herein in its entirety. Briefly, the saponified fatty acids are soap reaction products of a fatty acid with an alkaline compound selected from the group consisting of organic bases, alkali metal bases, alkaline earth metal bases, ammonium bases, and combinations thereof. The soap reaction products may be pre-formed prior to addition as an internal breaker, or may be formed in situ.

More specifically, and in non-limiting embodiments, the brines may be prepared using salts including, but not necessarily limited to, NaCl, KCl, CaCl$_2$, MgCl$_2$, NH$_4$Cl, CaBr$_2$, NaBr$_2$, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and CaCl$_2$ or NaCl, CaCl$_2$, and CaBr$_2$ as non-limiting examples.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents RN$^+$ (R')$_2$ O$^-$ may have the following structure (I):

(I)

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include CLEARFRAC™, which may also comprise greater than 10% of a glycol. This patent is incorporated herein in its entirety by reference. One useful VES is an amine oxide. As noted, a particularly preferred amine oxide is tallow amido propylamine oxide (TAPAO), sold by Baker Oil Tools as SUR-FRAQ™ VES. SURFRAQ is a VES liquid product that is 50% TAPAO and 50% propylene glycol. These viscoelastic surfactants are capable capable of gelling aqueous solutions to form a gelled base fluid. The additives of this invention may also be used in DIAMOND FRAQ™ which is a VES system, similar to SURFRAQ, which contains VES breakers sold by Baker Oil Tools.

The amount of VES included in the fracturing fluid, as one non-limiting embodiment of a treatment fluid herein, depends on two factors. One involves generating, creating or producing enough viscosity to control the rate of fluid leak off into the pores of the fracture, which is also dependent on the type and amount of fluid loss control agent used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the proportion range herein may be from about 1.0 to about 6.0% by volume VES product. In an alternate, non-restrictive form of the invention, the amount of VES ranges from 2 to about 10 volume %.

In application, the stabilizing particles of MgO (or other nano-particulate) may be mixed with the VES-gelled fluids at the surface before they are pumped downhole.

In hydraulic fracturing applications, propping agents are typically added to the base fluid after the addition of the VES. The proppant, solid particle or gravel may be any solid particulate matter suitable for its intended purpose, for example as a screen or proppant, etc. Propping agents include, but are not limited to, for instance, quartz sand grains, glass and ceramic beads, bauxite grains, sintered bauxite, sized calcium carbonate, other sized salts, walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations may be used as the fracture design requires. The base fluid may also contain other conventional additives common to the well service industry such as water wetting surfactants, non-emulsifiers and the like. In another non-restrictive embodiment, the treatment fluid may contain other viscosifying agents, other different surfactants, clay stabilization additives, scale dissolvers, biopolymer degradation additives, and other common and/or optional components.

While the viscoelastic fluids herein are described most typically herein as having use in fracturing fluids, it is expected that they will find utility in completion fluids, gravel pack fluids, fluid loss pills, lost circulation pills, diverter fluids, foamed fluids, water and/or gas control fluids, enhanced oil recovery (i.e. tertiary recovery) fluids, and the like.

In a particularly useful embodiment herein, use of these particulate additives with internal VES breakers, such as polyenoic acid, may have synergistic clean-up effects for the nano-sized particle stabilized VES fluid. The nano-sized particle stabilizer agents may reduce or inhibit oil-like phase separation of the leaked-off VES fluids within the reservoir pores and with internal breaker present to reduce the leaked-off VES fluid's viscosity more rapid and possibly more complete VES fluid removal may be achieved, with return permeability as high as 90% and greater.

The invention will be further described with respect to the following Examples which are not meant to limit the invention, but rather to further illustrate the various embodiments.

EXAMPLES 1 AND 2

Figure 1:
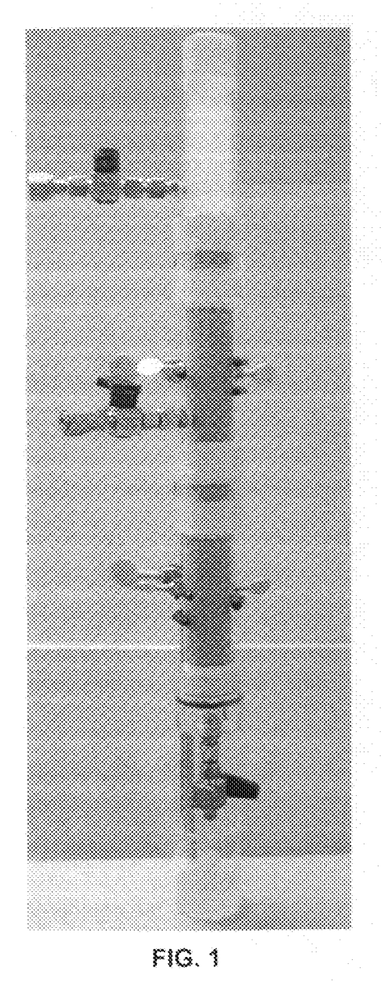
FIG. 1 is a photograph of a sand pack flow test apparatus, where a cloudy fluid of formation fines dispersed in water is shown positioned to enter at the top of a sand pack that does not contain nanoparticles, and after flow through the sand pack, the same cloudy water with formation fines was recovered.
Figure 3:
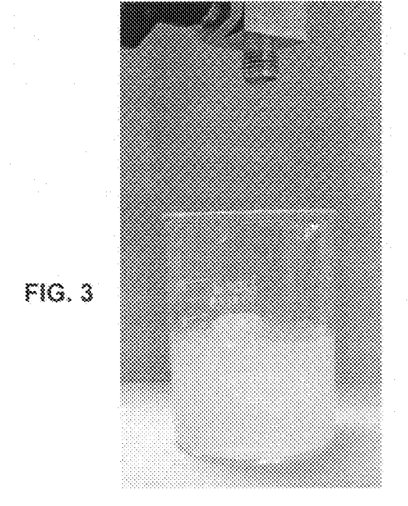
FIG. 3 is a more detailed photograph of the same cloudy water with formation fines recovered from the bottom of the sand pack of FIG. 1.
Figure 4:
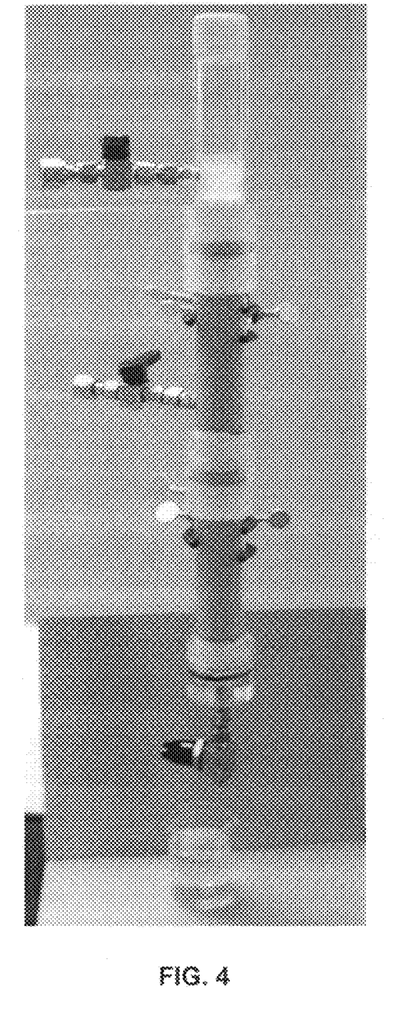
FIG. 4 is a photograph of a sand pack flow test apparatus, where a cloudy cloudy fluid of formation fines dispersed in water is shown positioned to enter the top of a sand pack containing nanoparticles, and after flow through the sand pack, where clear water without formation fines was recovered.
Figure 5:
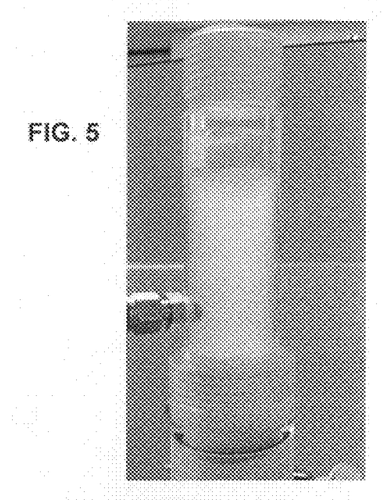
FIG. 5 is more detailed photograph of the cloudy fluid of formation fines dispersed in water positioned at the top of the sand pack of FIG. 4.
Figure 6:
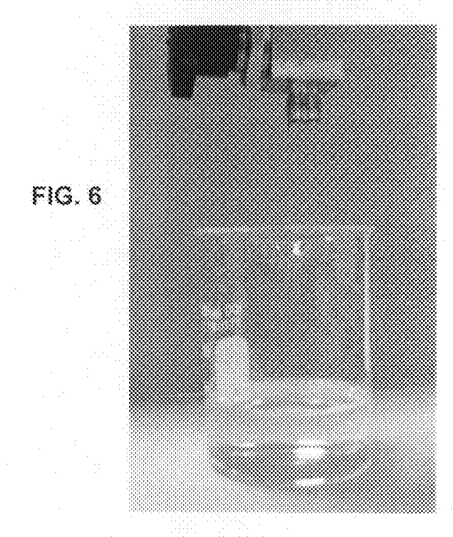
FIG. 6 is a more detailed photograph of the clear water substantially free of formation fines recovered at the bottom of the sand pack of FIG. 4.

Lab sand pack (20/40 mesh) tests with and without nanoparticles in VES fluids demonstrated that a sand pack containing nanoparticles can fixate formation fines in the sand pack after the VES-gelled fluid has its viscosity broken and was flowed out of the pack. The base fluid used was water containing 4 v/v % WG-3L VES, 7 wt % KCl and 3 v/v % fish oil internal breaker (Fish Oil 18:12 from Bioriginal Food & Science Corp.) The brine was gelled with the VES and mixed with 20/40 mesh (425/850 micron) sand and the viscosity broken with the internal breaker. In Example 1, no nanoparticles were added, and in Example 2, 20 pptg (2.4 kg/m$^3$) was present in the fracturing fluid. After the fracturing fluid was broken, the mixture was poured into a one inch ID (2.5 cm) acrylic tube with a 100 mesh (150 micron) screen at the bottom of the tube to let the broken fluid flow out of the tube and keep the sand pack in the tube. The acrylic tube has a 0.125 inch (3 mm) outlet orifice at the bottom. The total packed sand length of the tube was about 12 inches (30 cm). A solution of two percent potassium chloride brine was used to flush broken fracturing fluid from the packed column before a solution containing formation fines solution was run through the pack. The introduction of fines was simulated by a simple gravity feed of 0.25% bw Rev Dust in water. The mean particle size of the Rev Dust is about 20 microns and it contains 12% Quartz, 7% Cristobalite, 4% Illite, 29% Mixed layers (Bentonite), 26% Kaolinite, and 22% Chlorite. The nanoparticles used were 35 nm MgO, product #12N-0801 available from Inframat Advanced Materials The attached pictures, FIGS. 4-6, show that a cloudy fluid (the simulated formation fines dispersed in water) at the top of the sand pack (FIG. 5) flowed through the pack and that clean water flowed out of the pack at the bottom (FIG. 6), which meant that the fines were fixated within the pack by nanoparticles. The test without nanoparticles (FIGS. 1-3) shows that cloudy fluid at the beginning (top close-up of FIG. 2) flowed through the pack and that the same cloudy flow out of the pack, as demonstrated by the close-up in FIG. 3. Thus, Example 1 (FIGS. 1-3) with no nanoparticles within the sand pack retained little or none of the simulated fines, whereas Example 2 (FIGS. 4-6) where the nanoparticles were distributed into the sand pack after the breaking of the VES fluid fixed the simulated fines within the sand pack.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of nano-sized alkaline earth metal oxides, alkaline earth metal hydroxides, alkali metal oxides, alkali metal hydroxides, transition metal oxides, transition metal hydroxides, post-transition metal oxides, and post-transition transition metal hydroxides, of various sizes, brines, viscoelastic surfactants, internal breakers, and other components falling within the claimed parameters, but not specifically identified or tried in a particular composition, are anticipated to be within the scope of this invention. Further, different nano-size ranges of suitable materials different from those explicitly mentioned or exemplified herein may be used and still be within the scope of the invention. In another non-limiting embodiment, the compositions and methods herein may find utility in delivering MgO and similar materials in the fields of livestock feeding, fertilizer handling and pharmaceuticals.

The word "comprising" as used throughout the claims is to be interpreted "including but not limited to".

The present invention may suitably comprise, consist or consist essentially of the elements disclosed and may be practiced in the absence of an element not disclosed.

What is claimed is:

1. A method for reducing fines migration in a subterranean formation comprising:
introducing into the subterranean formation a fluid comprising:
an aqueous base fluid;
a viscoelastic surfactant in an amount effective to increase the viscosity of the fluid;
proppants;
an amount of a particulate additive effective to reduce fines migration and further in an amount effective to have an effect selected from the group consisting of improved viscosity stability, improved fluid loss, and both, as compared with an otherwise identical fluid absent the additive, where the particulate additive:
has a mean particle size of 100 nm or less, is selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof; and
pumping the fluid against the subterranean formation with sufficient pressure to cause at least one fracture; and
depositing the proppants and the particulate additive into the at least one fracture to form a proppant pack.

2. The method of claim 1 where
the alkaline earth metal is selected from the group consisting of magnesium, calcium, strontium, and barium,
the alkali metal is selected from the group consisting of lithium, sodium, potassium,
the transition metal is selected from the group consisting of titanium and zinc, and
the post-transition metal is aluminum, and mixtures thereof.

3. The method of claim 1 where the effective amount of the particulate additive ranges from about 20 to about 500 pptg (about 2.4 to about 60 kg/1000 liters) based on the fluid.

4. The method of claim 1 where the fluid is selected from the group consisting of a fracturing fluid, a gravel pack fluid, and a frac pack fluid.

5. The method of claim 1 where the mean particle size of the particulate additive is 90 nm or less.

6. The method of claim 1 where the fluid further comprises an internal breaker and the method further comprises reducing the viscosity of the fluid with the internal breaker after depositing the proppants and the particulate additive in the at least one fracture.

7. The method of claim 1 where the aqueous base fluid is brine.

8. A method for reducing fines migration in a subterranean formation comprising:
introducing into the subterranean formation a fluid comprising:
an aqueous base fluid;
a viscoelastic surfactant in an amount effective to increase the viscosity of the fluid;
proppants selected from the group consisting of sand, gravel, ceramic beads, glass beads, and combinations thereof;
a coating agent comprising oil; and
an amount of a particulate additive effective to reduce fines migration and further in an amount effective to have an effect selected from the group consisting of improved viscosity stability, improved fluid loss, and both, as compared with an otherwise identical fluid absent the additive, where the particulate additive:
has a mean particle size of 100 nm or less, is selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof; and pumping the fluid against the subterranean formation with sufficient pressure to cause at least one fracture; and depositing the proppants and the particulate additive into the at least one fracture to form a proppant pack.

9. The method of claim 8 where the alkaline earth metal is selected from the group consisting of magnesium, calcium, strontium, and barium, the alkali metal is selected from the group consisting of lithium, sodium, potassium, the transition metal is selected from the group consisting of titanium and zinc, and the post-transition metal is aluminum, and mixtures thereof.

10. The method of claim 8 where the effective amount of the particulate additive ranges from about 20 to about 500 pptg (about 2.4 to about 60 kg/1000 liters) based on the fluid.

11. The method of claim 8 where the fluid is selected from the group consisting of a fracturing fluid, a gravel pack fluid, and a frac pack fluid.

12. The method of claim 8 where the mean particle size of the particulate additive is 65 nm or less.

13. The method of claim 8 where the fluid further comprises an internal breaker and the method further comprises reducing the viscosity of the fluid with the internal breaker after depositing the proppants and the particulate additive in the at least one fracture.

14. The method of claim 8 where the aqueous base fluid is brine.

15. A method for reducing fines migration within a particle pack in a subterranean formation comprising:

introducing into the subterranean formation a fluid comprising:

a brine base fluid;

a viscoelastic surfactant in an amount effective to increase the viscosity of the fluid;

proppants selected from the group consisting of sand, gravel, ceramic beads, glass beads, and combinations thereof;

a coating agent comprising oil; and an amount of a particulate additive effective to reduce fines migration and further in an amount effective to have an effect selected from the group consisting of improved viscosity stability, improved fluid loss, and both, as compared with an otherwise identical fluid absent the additive, where the particulate additive:

has a mean particle size of 100 nm or less, is selected from the group consisting of:

alkaline earth metal oxides and alkaline earth metal hydroxides where the alkaline earth metal is selected from the group consisting of magnesium, calcium, strontium, and barium, alkali metal oxides and alkali metal hydroxides, where the alkali metal is selected from the group consisting of lithium, sodium, and potassium, transition metal oxides and transition metal hydroxides where the transition metal is selected from the group consisting of titanium and zinc, aluminum oxides and aluminum hydroxides, piezoelectric crystals, pyroelectric crystals, and mixtures thereof; and pumping the fluid against the subterranean formation with sufficient pressure to cause at least one fracture; and depositing the proppants and the particulate additive into the at least one fracture to form a proppant pack.

16. The method of claim 15 where the effective amount of the particulate additive ranges from about 20 to about 500 pptg (about 24 to about 60 kg/1000 liters) based on the fluid.

17. The method of claim 15 where the fluid is selected from the group consisting of a fracturing fluid, a gravel pack fluid, and a frac pack fluid.

18. The method of claim 15 where the mean particle size of the particulate additive is 50 nm or less.

* * * * *